(12) United States Patent
Igarashi et al.

(10) Patent No.: US 8,129,055 B2
(45) Date of Patent: Mar. 6, 2012

(54) FUEL CELL WITH ANODE EXHAUST RECIRCULATION MEANS

(75) Inventors: Hitoshi Igarashi, Atsugi (JP); Keisuke Suzuki, Atsugi (JP); Masatoshi Iio, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1231 days.

(21) Appl. No.: 11/658,987

(22) PCT Filed: Sep. 2, 2005

(86) PCT No.: PCT/IB2005/002596
§ 371 (c)(1),
(2), (4) Date: Jan. 30, 2007

(87) PCT Pub. No.: WO2006/024933
PCT Pub. Date: Mar. 9, 2006

(65) Prior Publication Data
US 2009/0214909 A1    Aug. 27, 2009

(30) Foreign Application Priority Data
Sep. 3, 2004 (JP) ................. 2004-257311

(51) Int. Cl.
*H01M 8/04* (2006.01)
*H01M 8/06* (2006.01)

(52) U.S. Cl. .......... 429/414; 429/427; 429/450
(58) Field of Classification Search .......... None
See application file for complete search history.

(56) References Cited

U.S. PATENT DOCUMENTS
2002/0009623 A1 *  1/2002  St-Pierre et al. ......... 429/13
2004/0001980 A1    1/2004  Balliet et al.

FOREIGN PATENT DOCUMENTS
WO    WO 2005/053070 A1    6/2005
* cited by examiner

*Primary Examiner* — Keith Walker
(74) *Attorney, Agent, or Firm* — Young Basile

(57) ABSTRACT

Moisture caused by humidity in the fuel gas and water vapor from the water that is generated become condensed inside a fuel cell when power generation in the fuel cell is temporarily stopped, making obstruction to the fuel gas flow channel when power generation is restarted possible. A fuel cell includes an electrolyte membrane sandwiched between a fuel electrode and an oxidant electrode. Oxidant is supplied to the oxidant electrode in the fuel cell, and the fuel emitted from the fuel electrode of the fuel cell is resupplied back to the fuel electrode. When requested power generating capacity for the fuel cell is less than a prescribed capacity, the oxidant supply is temporarily stopped while the fuel continues to circulate in order to prevent obstruction in the fuel flow channel due to water condensation, making a reliable fuel supply becomes possible.

23 Claims, 9 Drawing Sheets

FUEL CELL WITH ANODE EXHAUST RECIRCULATION MEANS

CROSS-REFERENCE TO RELATED APPLICATIONS

The present application claims priority under 35 U.S.C. §119 of Japanese Patent Application No. 2004-257311, filed on Sep. 3, 2004, the entire content of which is expressly incorporated by reference herein.

FIELD

The present invention relates to a fuel cell system that temporarily stops operation in a low power-generation capacity area in which power generation efficiency has declined.

BACKGROUND

Generally speaking, a fuel cell is a device that directly converts the chemical energy in fuel to electric energy by causing an electrochemical reaction between fuel gas, such as hydrogen, and an oxidant agent, such as air, etc. The conversion efficiency is very high, resulting in a wide variety of fuel cell applications, including use as energy supply source for a mobile object equipped with a motor as a drive source.

In order to obtain the desired energy from a fuel cell, it is necessary to supply a sufficient amount of fuel gas and oxidant to the fuel cell. However, when sudden changes in the requested energy occur, the requirement cannot be met due to a delay in the supply means. Therefore, a storage device, such as a secondary cell or a capacitor, is used as a backup supply source in order to compensate for the delay in a mobile object that utilizes a fuel cell.

For the fuel cell to generate power, it is necessary to operate a supply source consisting of fuel gas and an oxidant. In such a system, when the volume of power generation taken from the fuel cell is small, the energy consumed by the system backup device is large compared to the energy generated by the fuel cell, which actually results in a deterioration of the efficiency in obtaining useful energy. Therefore, by using a storage device for a mobile object equipped with a fuel cell, electricity can be supplied from the storage device for inefficient areas in which only a small amount of power is generated and by stopping the supply of the oxidant on the one hand, the chemical reaction that occurs in the fuel cell can be stopped and operation of inefficient areas can also be stopped. (For example, Unexamined Japanese Patent Publication No. 2001-307758 (Page 7, FIG. 5)).

SUMMARY

However, in a fuel cell system, once the supply of the oxidant is stopped, heat is no longer generated due to the chemical reaction and the temperature of the fuel cell drops. As a result, a problem occurs in which moisture from humidity in the fuel gas and the water vapor from the water that gets generated condense and the flow channel through which the fuel gas passes becomes obstructed, preventing the fuel gas from flowing when the oxidant supply is restarted. As a result, the requested amount of power generation cannot be realized.

In order to solve the aforementioned problem, the present invention pertains to a fuel cell system that is provided with a fuel cell that overlaps with a single cell comprised of an electrolyte membrane sandwiched between a fuel electrode and an oxidant electrode; an oxidant supply means that supplies the oxidant to said oxidant electrode and an exhaust fuel circulation means that resupplies the fuel emitted from said fuel electrode back to the fuel electrode; and whereby the main point of the present invention is that said system stops said oxidant supply means when the requested amount of power generation for said fuel cell is less than the prescribed amount of power generation and also causes the operation of said exhaust fuel circulation means to continue.

According to the present invention, when the requested amount of power generation to the fuel cell is less than the prescribed amount of power generation and the oxidant supply means is stopped on the one hand, the exhaust fuel circulation means is continued so that even if heat generation caused by the chemical reaction diminishes and the temperature drops, by continuing to circulate the fuel gas, obstruction of the fuel electrode flow channel can be prevented, resulting in the ability to maintain a favorable restart of the oxidant supply.

DETAILED DESCRIPTION

Next, a detailed explanation of the most favorable configuration for the present invention is provided with reference to the drawings.

Figure 1:
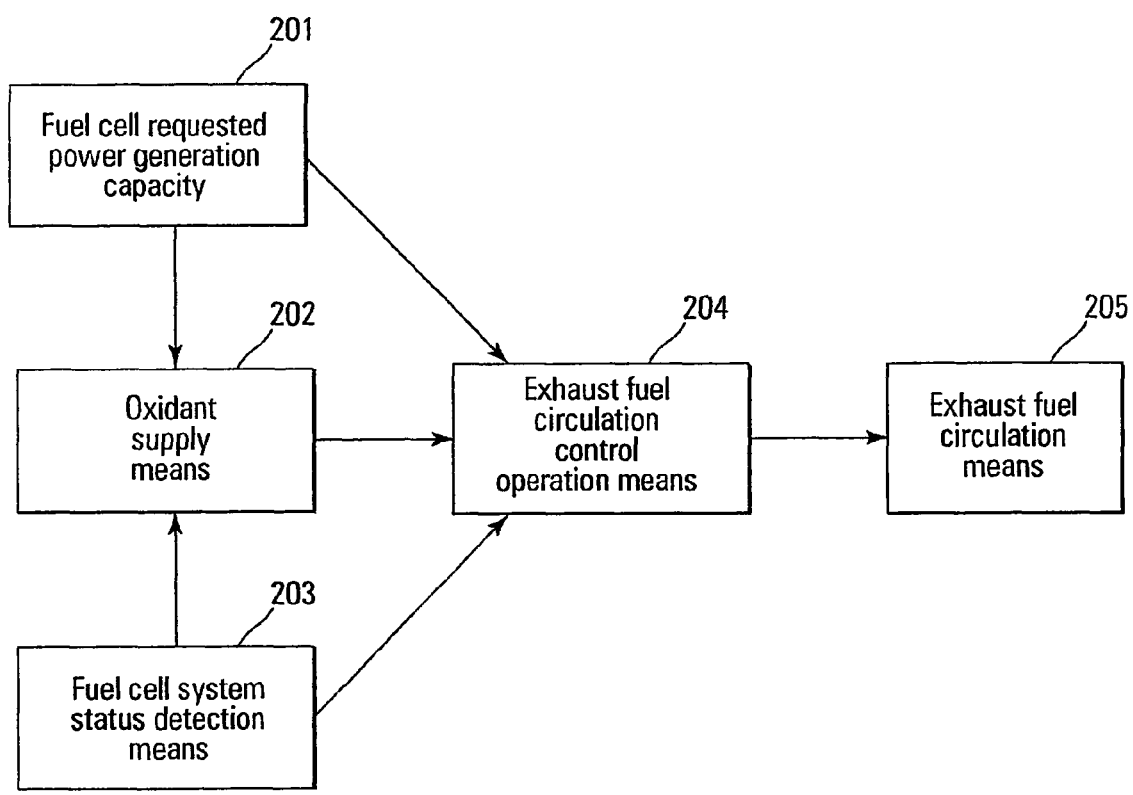
FIG. 1 is a control block diagram of the main portion of the fuel cell system that pertains to the present invention.

FIG. 1 is a control block diagram that explains the basic configuration of the fuel cell system pertaining to the present invention. Element 201 in the Figure is the requested capacity of power generation for the fuel cell (hereinafter referred to as fuel cell requested power generation capacity) for when a fuel cell is directly used as an energy supply source, such as a generator, or is indirectly used as an energy supply source, such as an energy supply source for the drive force of a mobile object. Fuel cell requested power generation capacity 201 can be applied from an external source or can be calculated within the fuel cell system.

Element 202 is the oxidant supply means, such as an air compressor, etc., for supplying the oxidant to the fuel cell and is controlled in accordance with the status detected by fuel cell requested power generation capacity 201 and fuel cell system status detection means 203, which is explained below. Exhaust fuel circulation control operation means 204 is the control device for exhaust fuel circulation means 205, which circulates the exhaust fuel emitted from the fuel cell, performs the control operation and controls the operation of exhaust fuel circulation means 205 based on the operation status of fuel cell requested power generation capacity 201, oxidant supply means 202 and the status detected by fuel cell system status detection means 203.

Figure 2:
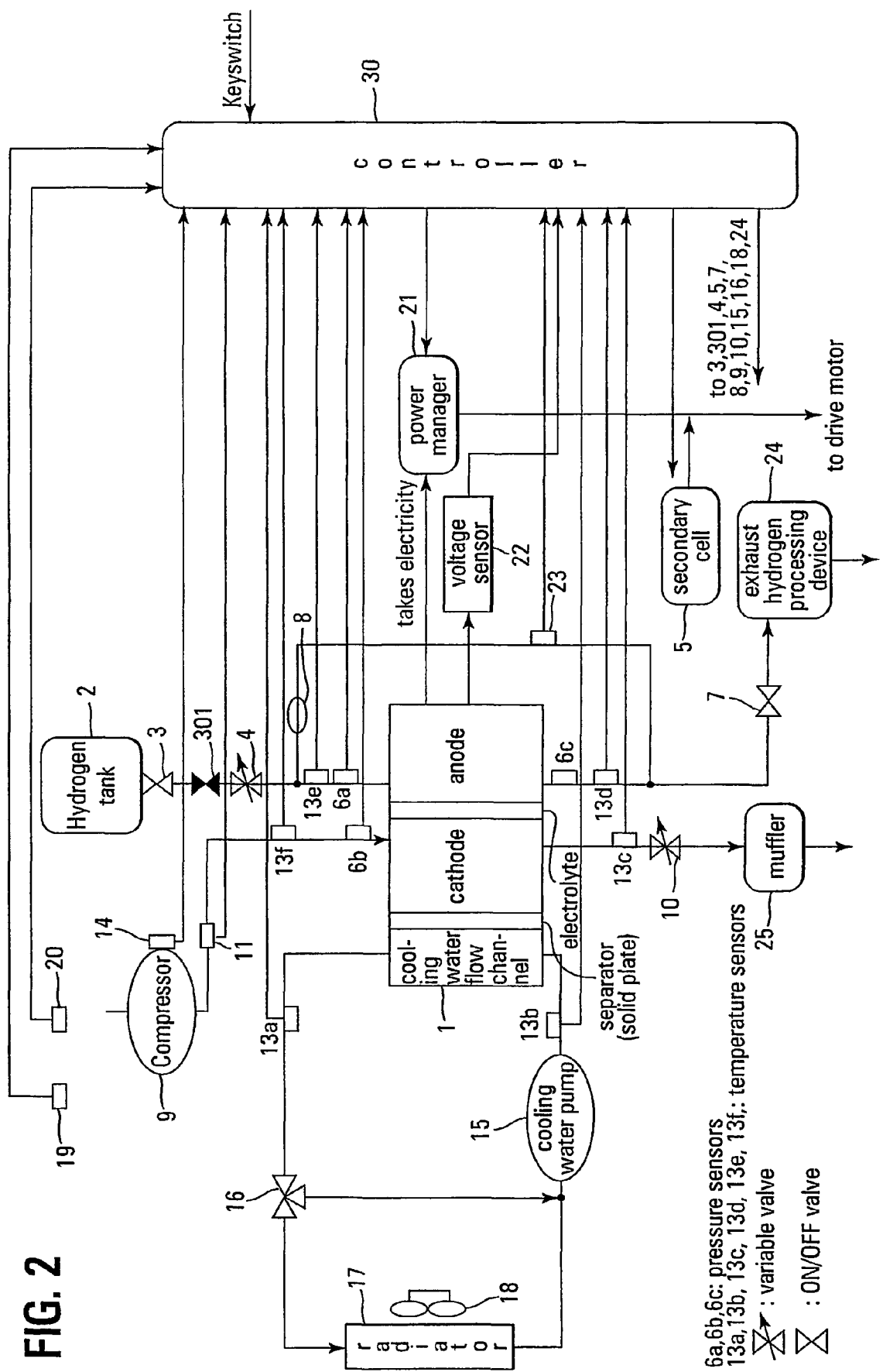
FIG. 2 is a system block diagram that explains the configuration of one working example of the fuel cell system that pertains to the present invention.

FIG. 2 is a system block diagram that explains the configuration of one working example of the fuel cell system pertaining to the present invention. In this diagram, for fuel cell 1, hydrogen gas is the fuel gas supplied to the anode and air is the oxidant gas supplied to the cathode. Electricity is generated by the electrochemical reaction shown below.

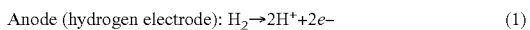

Anode (hydrogen electrode): $H_2 \rightarrow 2H^+ + 2e-$  (1)

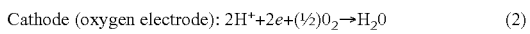

Cathode (oxygen electrode): $2H^+ + 2e + (\tfrac{1}{2})O_2 \rightarrow H_2O$  (2)

Entire fuel cell: $H_2 + (\tfrac{1}{2})O_2 \rightarrow H_2O$  (3)

When this reaction occurs, the $H_2$ generated at the cathode turns into water vapor, passes through the electrolyte membrane and enters the anode side. The supply of hydrogen to the anode goes from hydrogen tank 2 and passes through base valve 3, decompression valve 301 and hydrogen supply valve 4. The high pressure hydrogen that is supplied from hydrogen tank 2 is mechanically decompressed to a prescribed pressure by decompression valve 301 and the hydrogen pressure for the fuel cell is controlled to the desired hydrogen pressure by hydrogen supply valve 4. Hydrogen circulation pump 8 is the exhaust fuel circulation means set up for recycling the hydrogen that was not consumed at the anode.

Purge valve 7 serves the following purpose.

Exhausts the nitrogen that has accumulated inside the hydrogen system in order to restore the hydrogen pressure in the anode and inside the hydrogen circulation channel.

Blows out the water blockage that is obstructing the gas flow channel in order to restore the cell voltage.

The gas exhausted from purge valve 7 contains hydrogen. After exhaust hydrogen-processing device 24 either combusts or dilutes the hydrogen, it is emitted from the fuel cell system. Humidity sensor 23 detects the humidity of the gas exhausted from the anode in the fuel cell.

Air is supplied to the cathode by compressor 9. The flow volume supplied to fuel cell 1 by compressor 9 is detected by flow volume (or $O_2$) sensor 11. Values from rotation count sensor 14, external air temperature sensor 19 and air pressure sensor 20 are used to control compressor 9 in order to satisfy the target airflow volume even when the external air environment changes. The value detected by pressure sensor 6b is used to control the cathode air pressure by changing the surface area of the opening of air pressure adjustment valve 10.

The cooling water that passes through the cooling-water flow channel in fuel cell 1 is supplied from cooling-water pump 15. Three-way valve 16 switches and diverges the flow path of the cooling water in the direction of radiator 17 and the direction of the radiator bypass. Radiator fan 18 cools the cooling water by blowing air to the radiator. The temperature of the cooling water is regulated by driving three-way valve 16 and radiator fan 18.

Power manager 21 takes electricity from fuel cell 1 and supplies it to the motor (not shown in the drawing) that drives the mobile object. Secondary cell 5 is used as a backup power source to supply energy when power generation in the fuel cell does not reach the requested capacity.

Controller 30 uses sensor signals to control each of the actuators in the fuel cell system when it starts, generates power and stops.

Figure 3:
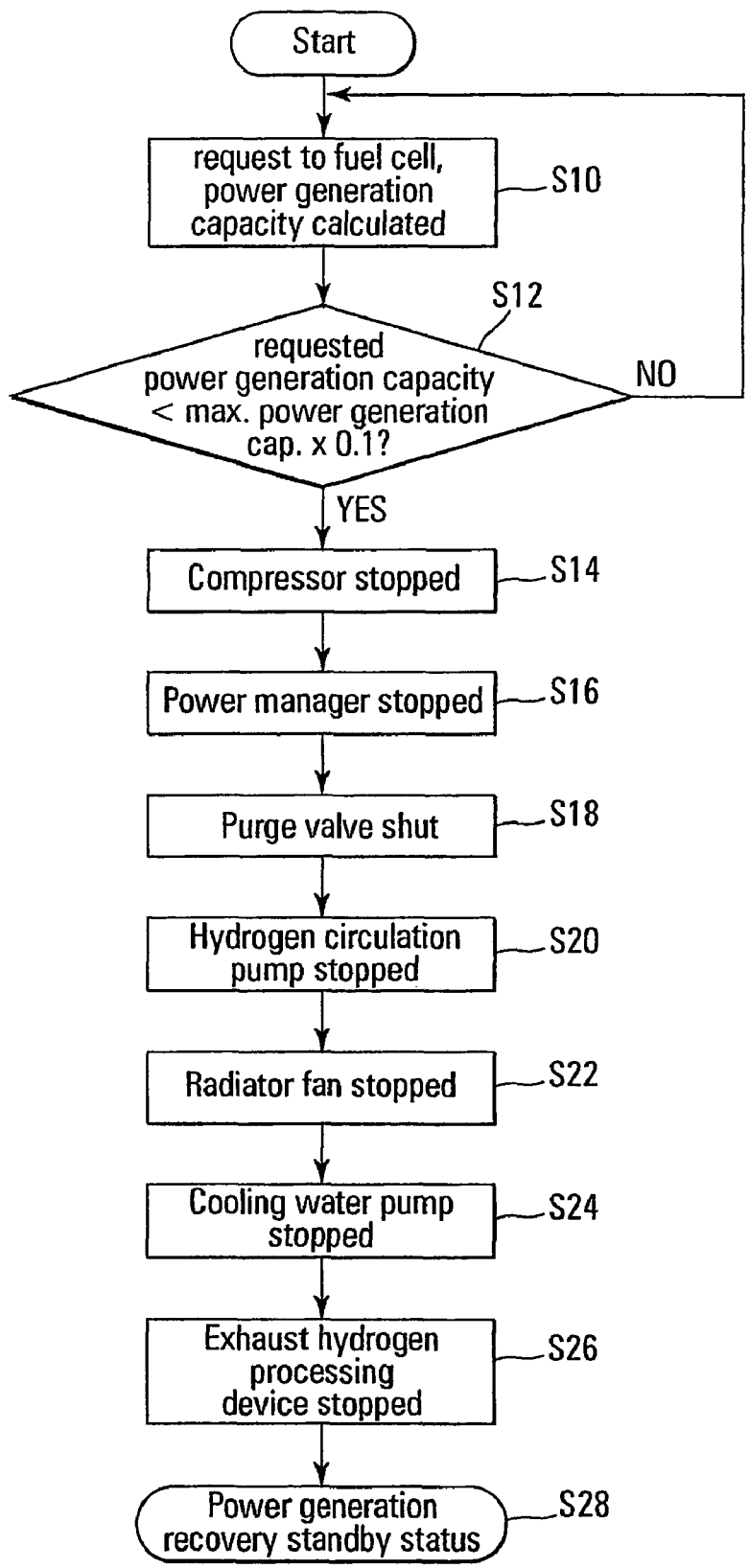
FIG. 3 is a control flow chart for the process up to power generation standby status for a fuel cell system for which the present invention is not applied.

Next, FIG. 3 is used as a reference to explain an example of the temporary stop of power generation for the fuel cell in the case in which the present invention is not enforced. First, for step S10, the requested power generation capacity to the fuel cell is read or calculated. Next, at step S12 it is determined whether or not the requested power generation capacity is in a low power generation capacity area, or less than 10% of the maximum power generation capacity. If the requested power generation capacity is 10% or more of the maximum power generation capacity, the system continues to monitor the requested power generation capacity and returns to S10 in order to continue generating power.

If it is determined at S12 that the requested power generation capacity is less than 10% of the maximum power generation capacity, the process proceeds to S14 and stops compressor 9. By stopping compressor 9, the chemical reaction that occurs in the fuel cell diminishes and energy can no longer be supplied from the fuel cell, so for S16, power manager 21 stops taking electricity from fuel cell 1 and uses secondary cell 5 to start supplying electricity to the load device. When this takes place, if purge valve 7 is left open, hydrogen is emitted from the system, so purge valve 7 is shut at S18. In order to extend the power generation stop time, the energy consumed by the backup device relating to power generation is also covered by secondary cell 5, so hydrogen circulation pump 8 is stopped at S20, radiator fan 18 is stopped at S22, cooling-water pump 15 is stopped at S24, exhaust hydrogen-processing device 24 is stopped at S26 and the system goes into power generation recovery standby status at S28.

Figure 4:
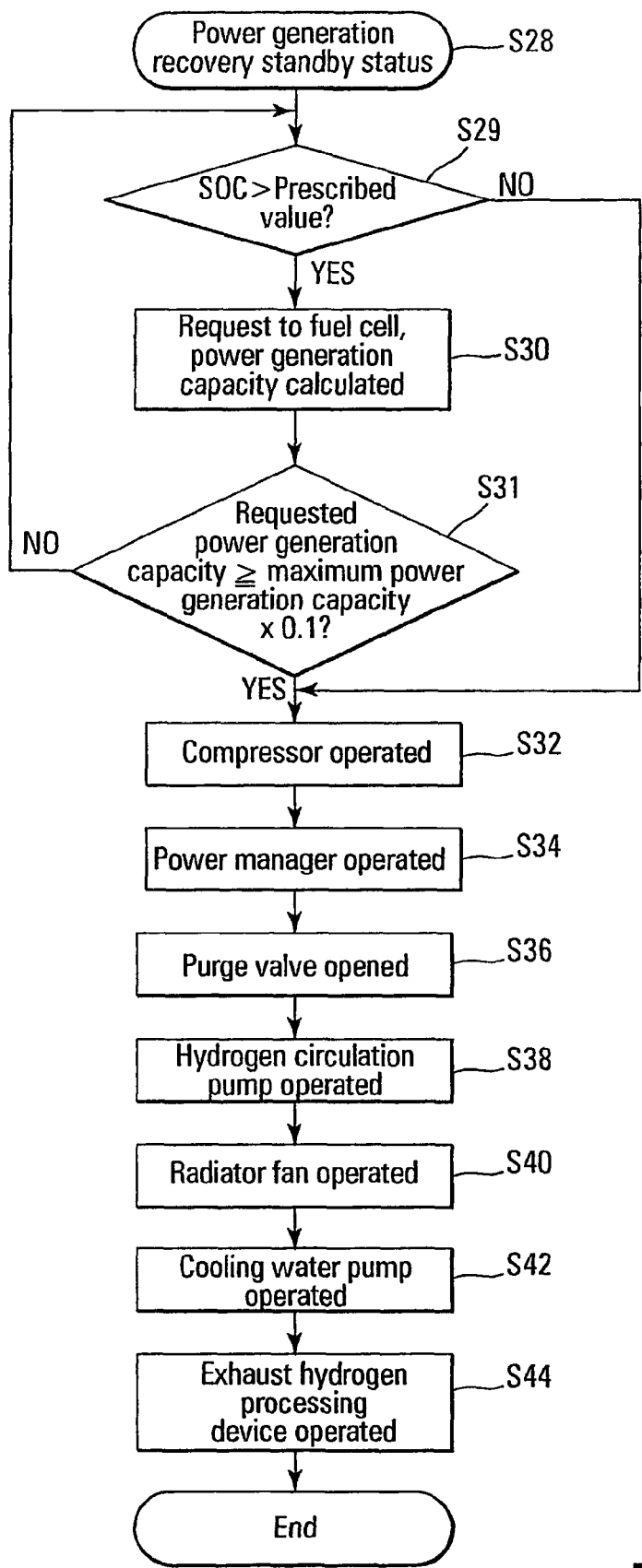
FIG. 4 is a control flow chart for the process up to power generation recovery for a fuel cell system for which the present invention is not applied.

FIG. 4 is a flowchart showing the process from power generation recovery standby status to power generation restart for when the present invention is not applied. First, at S29, it is determined whether or not the storage capacity (SOC) for secondary cell 5 exceeds the prescribed value necessary to restart power generation. If the SOC value does not exceed the prescribed value, the process moves on to S32 and restarts power generation. If it is determined at S29 that the SOC exceeds the prescribed value, the process proceeds to S30 and the requested power generation capacity to the fuel cell is read or calculated. Next, at S31, it is determined whether or not the requested power generation capacity to the fuel cell is more than or equal to 10% of the maximum power generation capacity. If the requested power generation capacity to the fuel cell is more than or equal to 10% of the maximum power generation capacity, the process proceeds to S32, where compressor 9 is operated, air is supplied to fuel cell 1 as the oxidant, power generation is restarted and the process moves on to S34.

If it is determined at S31 that the requested power generation capacity to the fuel cell is less than 10% of the maximum power generation capacity, because this is an inefficient area of power generation, the system continues to monitor the SOC for the secondary cell and fuel cell requested power generation capacity and returns to S29 in order to continue stopping the power generation.

At S34, power manager 21 takes electricity from fuel cell 1 and supplies the electricity to the load for the drive motor and the like. Next, the purge valve is opened at S36, hydrogen circulation pump 8, which was stopped at S38, is operated, radiator fan 18 is operated at S40, cooling-water pump 15 is operated at S42 and exhaust hydrogen-processing device 24 is restarted at S44.

Therefore, for the present invention, even when compressor 9 is stopped in response to the requested power generation capacity, by controlling hydrogen circulation pump 8 in accordance with the status detection signal for the fuel cell system, obstruction of the gas flow channel due to water condensation can be prevented, the performance is not compromised when power generation is restarted and the requested power generation capacity can be met.

However, if the fuel cell temperature for before power generation was stopped is extremely high, for example, a large amount of water vapor permeates from the cathode side to the anode side, so when power generation is stopped and the temperature drops, water condensation occurs in the hydrogen gas flow channel and inside the anode, obstructing the flow of hydrogen gas. Therefore, when the fuel cell requested power generation capacity increases, even if an attempt is made to restart power generation, since the hydrogen gas cannot be transmitted, power cannot be generated.

Figure 5A:
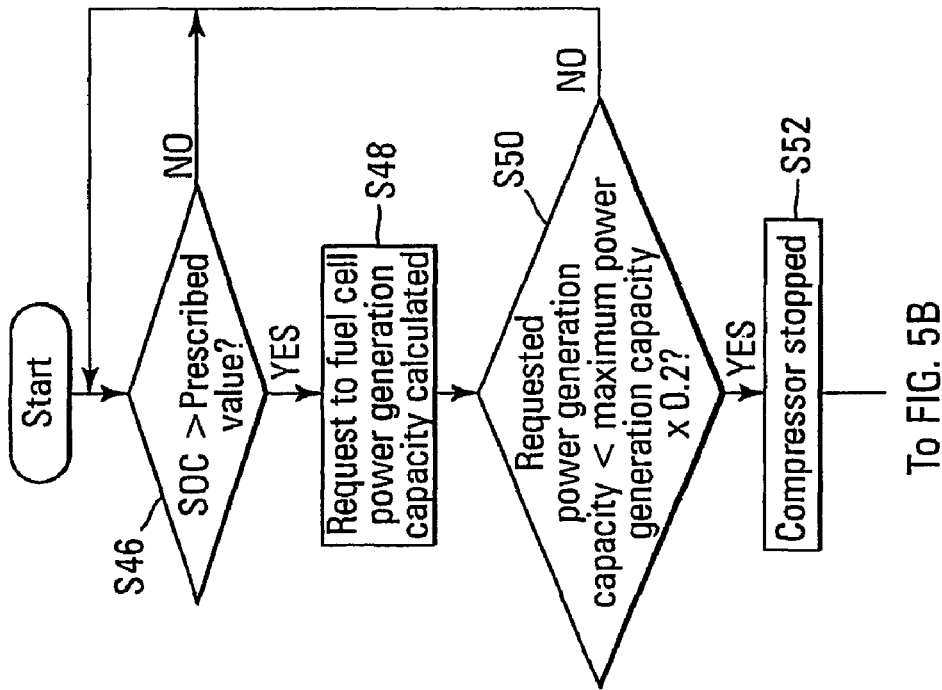
FIG. 5 is a control flow chart for the process up to power generation standby status for a working example of the fuel cell system that pertains to the present invention.
Figure 5B:
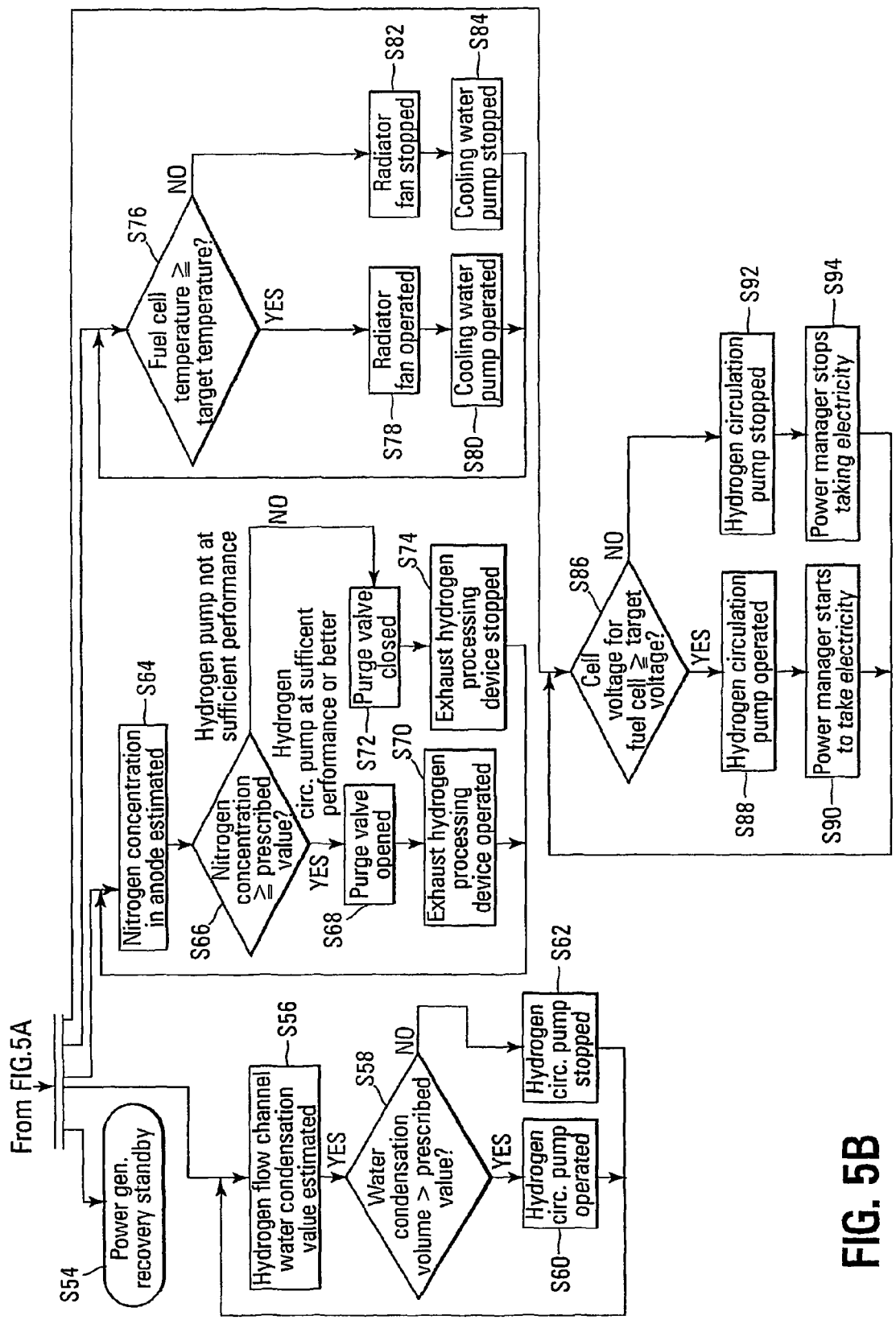

Next, FIG. 5 is used as a reference to explain the control operation of controller 23 for when power generation is temporarily stopped in relation to the working example for the present invention.

First at S46 it is determined whether or not the storage capacity (SOC) for secondary cell 5 exceeds the prescribed value. The prescribed value, which is the value determined at S46, is based on the power capacity requested to restart the fuel cell and the amount of energy consumed by hydrogen circulation pump while power generation is temporarily stopped.

If it is determined at S46 that the SOC does not exceed the prescribed value, the process returns to S46, power generation is continued and the SOC is determined again while secondary battery 5 is being recharged.

If it is determined at S46 that the SOC exceeds the prescribed value, the process moves on to S48, the requested power generation capacity to the fuel cell is read or calculated and it is then determined at S50 whether or not the fuel cell requested power generation capacity is less than 20% of the maximum power generation capacity.

If it is determined at S50 that the fuel cell requested power generation capacity is less than 20% of the maximum power generation capacity for the fuel cell 1, the process proceeds to S52. If it is determined at S50 that the fuel cell requested power generation capacity is more than or equal to 20% of the maximum power generation capacity for the fuel cell 1, the process returns to S46. The value determined at S50, which is 20% of the maximum power generation capacity for the fuel cell 1, is one example and it is also possible to have a power generation capacity in which the power generation efficiency for the fuel cell 1 is 70% of the maximum power generation efficiency.

At S52, compressor 9, which is the oxidant supply means, is stopped. Once compressor 9 has been stopped at S52, the estimation of the amount of water condensation in the hydrogen flow channel performed at S56, the estimation of the nitrogen concentration within the anode performed at S64, the detection of the fuel cell temperature performed at S76 and the detection of the cell voltage for the fuel cell performed at S86 are started in parallel (can be processed in random order) and the process goes into power generation recovery standby status.

For the hydrogen flow channel water condensation volume estimation performed at S56, the amount of water condensation in the hydrogen flow channel is estimated based on the status detection signal for the fuel cell system. At S58, it is determined whether or not the amount of water condensation that is estimated exceeds the prescribed value. The prescribed value for S58 is established by conducting an experiment to confirm the circumstances under which water obstruction occurs and a value that is lower than the threshold value at which water obstruction occurs is established as the prescribed value.

If it is determined at S58 that the amount of water condensation exceeds the prescribed value, the process proceeds to S60, the hydrogen circulation pump is operated and the process returns to S56. If it is determined at S58 that the amount of water condensation does not exceed the prescribed value, the process proceeds to S62, the hydrogen circulation pump is stopped and the process returns to S56.

As described above, for the present working example, by deciding whether to operate the hydrogen circulation pump (exhaust fuel circulation means) based on the estimation result for the amount of water condensation, the operation of hydrogen circulation pump 8 can be minimized when the amount of water obstruction is small, resulting in reduced energy consumption by hydrogen circulation pump 8.

In addition, for the present working example, even after the air supply from compressor 9 is stopped, by operating hydrogen circulation pump 8 (exhaust fuel circulation means) and the heat generated by the chemical reaction diminishes, a flow of fuel gas to the fuel electrode side can be created in order to prevent obstruction due to water condensation in the flow channel at the fuel electrode side and the performance of the restart operation can be preserved.

For the estimation of the nitrogen concentration inside the anode performed at S64, the concentration of nitrogen inside the anode is estimated based on the status detection signal for the fuel cell system. It is determined at S66 whether or not the estimated nitrogen concentration exceeds the prescribed value. The prescribed value for S66 is obtained by conducting an experiment to determine the relationship between the nitrogen concentration, the power generation efficiency and the mileage efficiency and the value for when the nitrogen concentration starts to purge is established at the prescribed value.

If it is determined at S66 that the nitrogen concentration is more than or equal to the prescribed value, the process proceeds to S68, the purge valve 7 is opened, the exhaust hydrogen processing device is operated at S70, and the process returns to S64. If it is determined at S66 that the nitrogen concentration is less than the prescribed value, the process proceeds to S72, the purge valve 7 is shut, the exhaust hydrogen-processing device is stopped at S74, and the process returns to S64.

As described above, for the processing that follows S64, the nitrogen concentration inside of the fuel electrode is either measured or estimated and based on this concentration, the nitrogen exhaust means that exhausts the nitrogen inside of the fuel cell electrode out of the system is operated. By controlling the nitrogen exhaust means so that the nitrogen concentration is kept at a level whereby the circulation performance for the exhaust fuel circulation means can be maintained, the amount of hydrogen that is exhausted is reduced, resulting in reduced consumption of hydrogen.

For the fuel cell temperature detection/determination performed at S76, the detection signal from the fuel cell temperature sensor is read to determine whether or not it is more than or equal to the target temperature. The target temperature value for S76 is the target operating temperature for the fuel cell and is the temperature at which the power generation efficiency of the fuel cell is the highest.

If it is determined at S76 that the fuel cell temperature is more than or equal to the target temperature, the process proceeds to S78, the radiator fan is operated, the cooling-water pump is operated at S80, and the process returns to S76. If it is determined at S76 that the fuel cell temperature is less than the target temperature, the process proceeds to S82, the radiator fan 18 is stopped, the cooling-water pump 15 is stopped at S84, and the process returns to S76.

As described above, for the processing that follows S76, in order to maintain a temperature for the fuel cell that will ensure high power generation efficiency, deterioration of power generation efficiency of the fuel cell due to a drop in temperature can be prevented, the amount of water condensation that occurs due to changes in the temperature and the occurrence of water obstruction can be suppressed.

For the fuel cell voltage detection/determination that is performed at S86, the detection signal from the voltage sensor for the fuel cell is read to determine whether or not the cell voltage is higher than or equal to the target voltage. The target voltage for S86 is a cell voltage at which the fuel cell performance does not deteriorate and is determined by the material used for the electrodes in the fuel cell.

If it is determined at S86 that the cell voltage for the fuel cell is higher than or equal to the target voltage, the process proceeds to S88, the hydrogen circulation pump 8 is operated, electricity is taken from the fuel cell 1 by the power manager at S90, the hydrogen is consumed at the anode to lower the voltage, and the process returns to S86. If it is determined at S86 that the cell voltage for the fuel cell 1 is lower than the target voltage, the process proceeds to S92, the hydrogen circulation pump 8 is stopped, electricity stops being taken from the fuel cell 1 by the power manager at S94, and the process returns to S86.

The target voltage for S86 is set at a prescribed value that is lower than the voltage at which the performance of the fuel cell deteriorates. This prevents the deterioration of the fuel cell performance due to excessive voltage that occurs when power generation is temporarily stopped.

In addition, based on the determination made at S86, when operation of the hydrogen circulation pump at S88 and stopping of the hydrogen circulation pump at S92 is repeated, by limiting the amount of change that takes place in the time between operation and temporary stopping, the amount of change in the sound made for operating and stopping can be suppressed, allowing for a more pleasant ride for the user of a mobile object that utilizes a fuel cell.

Figure 6:
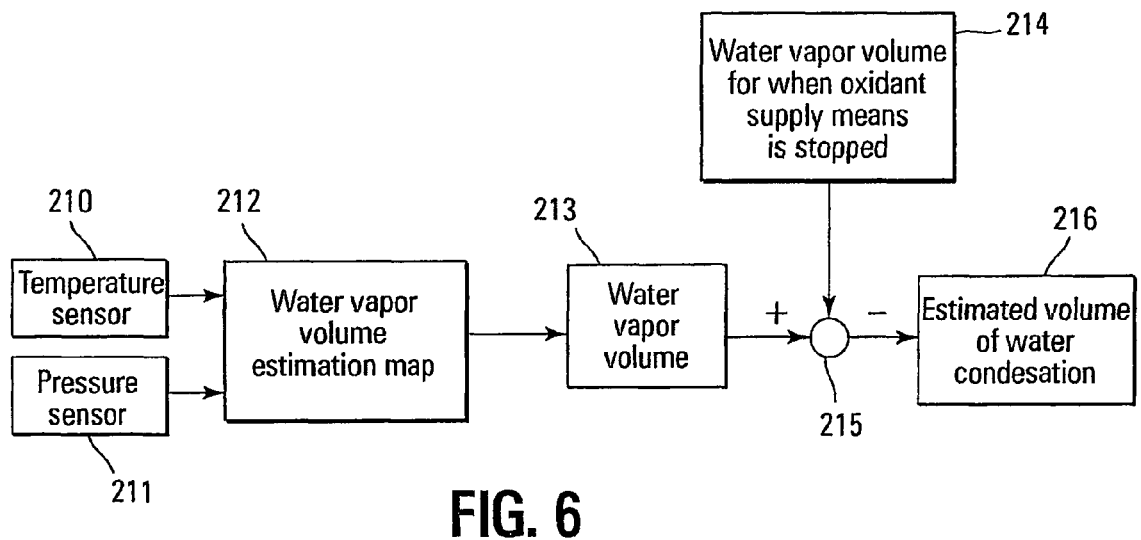
FIG. 6 is a block diagram of a working example of the water condensation volume estimation calculation that pertains to the present invention.

Next, a detailed explanation of a working example of the estimation of the amount of water condensation that occurs in the hydrogen flow channel for S56 is given with reference to the control block diagram in FIG. 6. The values detected by temperature sensor 210 and pressure sensor 211, which are placed at the hydrogen supply and circulation channels to the fuel cell (shown in FIG. 2 as 13e and 13d and 6a and 6c, respectively) are used to access water vapor volume estimation map 212, which calculates the volume of water vapor. The difference in the sequence of the result, or water vapor volume 213, and water vapor volume 214, which is calculated immediately after the oxidant supply means (compressor) is stopped, is obtained by subtracter 215 and this amount equals estimated water condensation volume 216.

Since the longer the time is that elapses after power generation is stopped, the greater the volume of water condensation will be, the amount of time elapsed since the compressor was stopped can be measured and corrections can be made based on the fact that the longer the time is, the greater the amount of water condensation will be. Also, the lower the external temperature is, the colder the piping for the hydrogen supply and circulation path channels will become, causing water condensation in a portion of the tubing, so corrections can be made based on the fact that the lower the external temperature is, the greater the amount of water condensation will be.

For the working example, pressure sensors and temperature sensors are placed at the hydrogen supply and circulation channels and a humidity sensor is placed at the circulation channel and the amount of water condensation is calculated based on the sensor value obtained from at least one place. However, it is also possible to place a pressure sensor, temperature sensor and humidity sensor inside the fuel cell and estimate the volume of water condensation inside the fuel cell or use the average value obtained from a plurality of sensors to estimate the average volume of water condensation inside the system.

Figure 7:
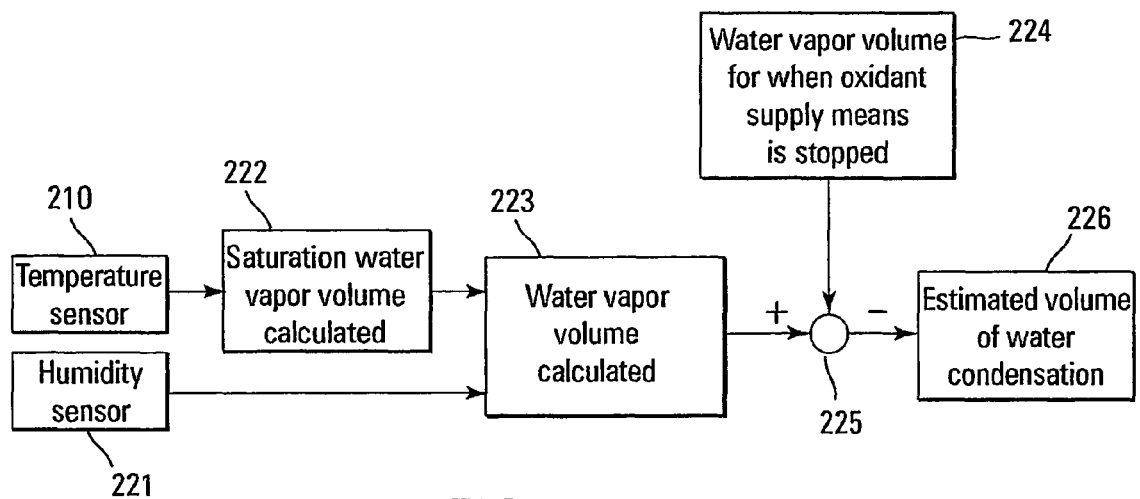
FIG. 7 is a block diagram of another working example of the water condensation volume estimation calculation that pertains to the present invention.

Next, a detailed explanation of another working example of the estimation of the amount of water condensation that occurs in the hydrogen flow channel for S56 is given with reference to the control block diagram in FIG. 7. The values detected by temperature sensor 210 and humidity sensor 221, which are placed at the hydrogen supply and circulation channels to the fuel cell (shown in FIG. 2 as 13e and 13d and 23, respectively) are used estimate the water condensation volume. Saturation water vapor volume 222 is calculated from the value detected by temperature sensor 210 and water vapor volume 223 is obtained from that figure and the relative humidity of humidity sensor 221. The difference in the sequence of water vapor volume 223, and water vapor volume 224, which is calculated immediately after the oxidant supply means (compressor) is stopped, is obtained by subtracter 225 and this equals estimated water condensation volume 226.

For this working example, a humidity sensor is used, but for a fuel cell with an internal humidifier in which the approximate saturation water vapor pressure is that which occurs inside the fuel cell and in the circulation channel, the curved line showing the saturation water vapor pressure obtained from the temperature that is detected can be used as a reference to obtain the water vapor volume, eliminating the need for a humidity sensor.

Based on these estimated volumes for the water condensation, when a large volume is estimated, the hydrogen circulation pump is operated to eliminate the water obstruction in the flow channel and when a small volume is estimated, it is stopped. By operating and stopping the hydrogen circulation pump based on the estimated volume of water condensation, energy consumption can be curtailed and the occurrence of water obstruction can also be controlled.

When switching between the operation and stopping of the hydrogen circulation pump, the amount of change in the number of times in which the pump rotates in relation to the time can be limited and the amount of change in the sound made for operating and stopping can be suppressed, allowing for a more pleasant ride for the user of a mobile object.

The aforementioned working example is an example of a method for estimating the volume of water condensation using a sensor, but the system could be configured so that water condensation taking place in the fuel cell, supply channel or circulation channel was collected in at least one of these places and measured at that location to operate the hydrogen circulation pump based on the measurement result.

Also in the aforementioned working example, control was performed by switching between operating and stopping the pump based on the amount of water condensation estimated, but operation and stopping can be periodically switched and depending on the estimated volume. When a large amount is estimated, the volume for when operation takes place, the ratio of operation time during one cycle or the repeat cycle time can be changed. So, when a large volume is estimated, the number of revolutions while the pump is operating is increased, the ratio of operating time is increased or the cycle time is reduced.

Figure 8:
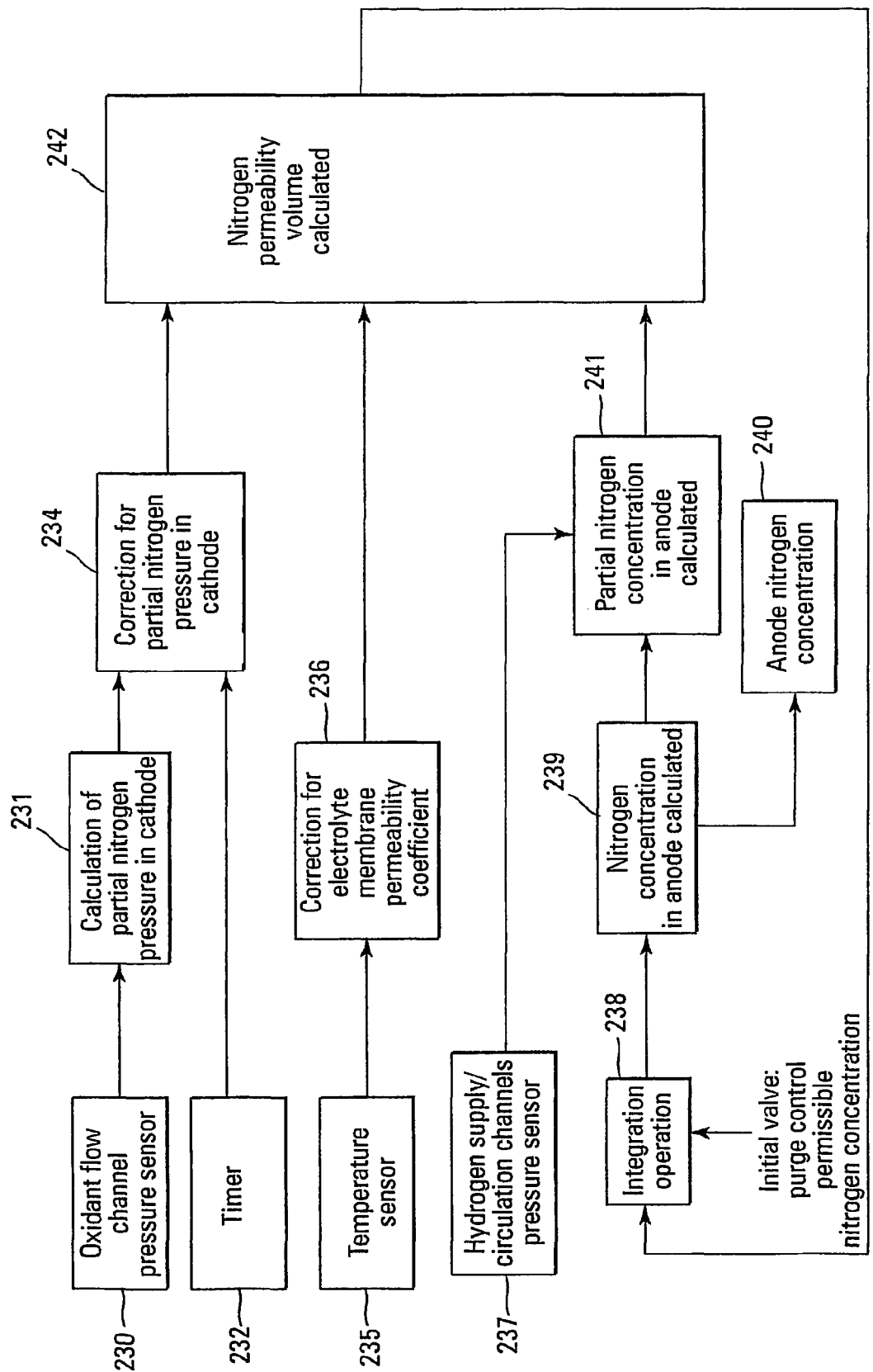
FIG. 8 is a block diagram of the estimation calculation for the nitrogen concentration inside the anode that pertains to the present invention.

Next an explanation of the estimation of the nitrogen content in the anode is provided in reference to the control block diagram in FIG. 8. The estimation is conducted using the pressure sensor, temperature sensor and humidity sensor placed at the hydrogen supply and circulation channels to the fuel cell, the time measured since the compressor located inside the controller is stopped and the pressure sensor and temperature sensor placed at the oxidant flow channel.

The partial nitrogen pressure in cathode 231 is calculated from pressure sensor 230 at the oxidant flow channel and the temperature sensor. Immediately after power generation is stopped, the inside of the cathode is almost at saturation water vapor pressure and the oxygen concentration is low because it is consumed by the power generation. However, as time progresses, the oxygen that enters the cathode due to natural diffusion and the volume of water condensation increases and the partial nitrogen pressure changes, so partial nitrogen pressure correction 234 is performed based on the amount of time measured since oxidant supply has been stopped by timer 232.

The amount of nitrogen that permeates to the anode side is determined by the nitrogen permeability coefficient of the electrolyte membrane and the partial nitrogen pressure between the anode and cathode. Since the nitrogen permeability coefficient for the electrolyte membrane changes according to the temperature, the permeability coefficient used when the volume that is permeated is calculated by taking the average value of the values detected by the temperature sensors located at the hydrogen supply and circulation channels and the temperature sensor located at the oxidant flow channel and this value becomes representative temperature sensor 235 that performs electrolyte membrane permeability coefficient 236.

Since the partial nitrogen pressure on the anode side ensures the circulation performance of the hydrogen circulation pump while power generation takes place, the permissible nitrogen concentration is purge-controlled as the target value and based on the calculated nitrogen concentration, hydrogen supply/circulation channel pressure sensor 237 is used to obtain the initial partial nitrogen pressure. Then, the permeation volume to the anode 242 is calculated from the difference between anode partial nitrogen pressure 241 and cathode partial nitrogen pressure 234 and the corrected electrolyte membrane permeability coefficient 236. Since anode partial nitrogen pressure 241 increases each time the nitrogen permeates, integration operation 238 is performed.

Although the aforementioned working example is an example for estimating the nitrogen concentration in the anode, the nitrogen concentration can also be calculated by providing a nitrogen concentration sensor to measure the nitrogen concentration in the anode or by providing a temperature sensor, humidity sensor and pressure sensor in the anode to measure the water vapor concentration, or by further providing a hydrogen concentration sensor to measure the hydrogen concentration.

If the results of the estimation for the nitrogen concentration in the anode show an increased concentration of nitrogen, purge valve 7 can be opened to lower the concentration and ensure the circulation performance of hydrogen circulation pump 8. When this is done, hydrogen is emitted along with the nitrogen, so exhaust hydrogen-processing device 24 is also operated. The operation of exhaust hydrogen-processing device 24 is performed in accordance with either the estimated amount or measured amount of nitrogen concentration. The higher the nitrogen concentration, the more minimal the operation of exhaust hydrogen processing unit 24 is made.

When compressor 9 is stopped, the chemical reaction also stops, heat is no longer generated in the fuel cell and the temperature drops. However, if cooling-water pump 15 and radiator fan 18 are stopped while the fuel cell is still hot, a temperature irregularity between the cooling water inside the fuel cell and the cooling water at the side on which radiator 17 is located occurs and when power generation is restarted, hunting occurs in the cooling water temperature control. Therefore, circulation of the cooling water is continued in order to continue cooling fuel cell 1 until the cooling water cools down to the target temperature. If the temperature drops too much, the occurrence of water condensation will increase and the power generation efficiency of the fuel cell will decline, so cooling-water pump 15 and radiator fan 18 should be stopped at a temperature that is conducive to efficient power generation.

Even when compressor 9 is stopped, air enters the cathode, passes through the electrolyte membrane and reacts with the residual hydrogen. If more than 0.8V of voltage for a single cell occurs due to this reaction, it will cause catalytic deterioration in the fuel cell. Therefore, the cell voltage is detected by voltage sensor 22 and current is continually taken from fuel cell 1 by power manager 21 until the voltage drops to prevent deterioration of fuel cell 1. When this is done, hydrogen becomes insufficient in a portion of the anode side and this can also cause deterioration, so hydrogen circulation pump 8 is rotated to promote distribution of hydrogen to the cell. Since the amount of hydrogen consumed will differ depending on the amount of electricity being taken, the amount of hydrogen consumed is estimated from the voltage and current and the number of times that hydrogen circulation pump 8 is rotated is determined in accordance with the result of the estimation. The larger the estimated volume of hydrogen is, the greater the amount of times hydrogen circulation pump 8 is rotated.

Figure 9:
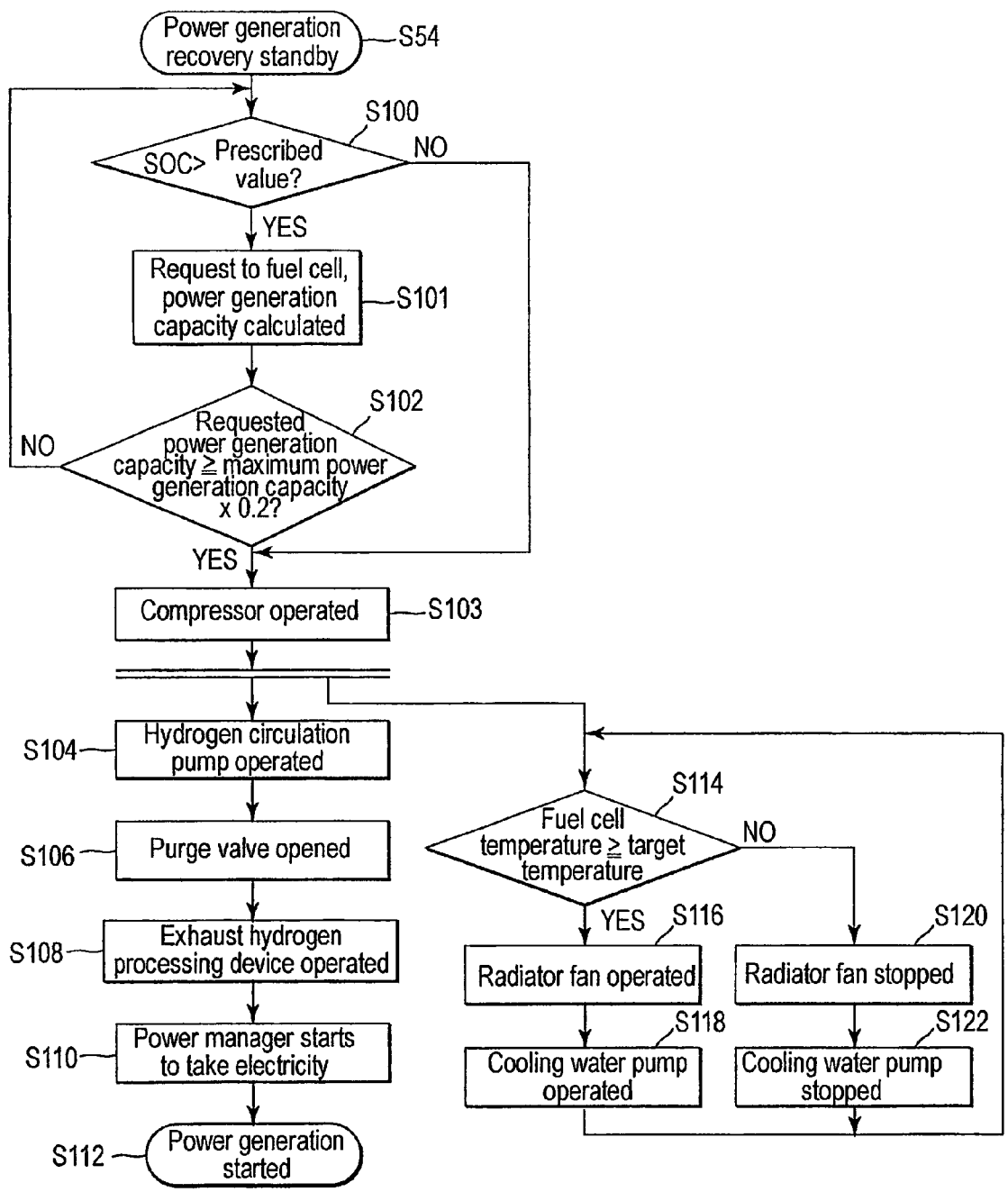
FIG. 9 is a control flow chart of the process up to power generation recovery for a working example of the fuel cell system that pertains to the present invention.

Next, an explanation of the process from power generation standby status to recovery of power generation status is provided in reference to the control flow chart in FIG. 9.

First, at S100, it is determined whether or not the storage capacity (SOC) of secondary cell 5 exceeds the prescribed value. If the SOC does not exceed the prescribed value, the process returns to S100. The prescribed value for this step is the storage capacity that secondary cell 5 requires to restart power generation of fuel cell 1.

If it is determined at S100 that the storage capacity of secondary cell 5 exceeds the prescribed value, the requested power generation capacity to the fuel cell is read or calculated at S101. Next, at S102, it is determined whether or not the requested power generation capacity is more than or equal to 20% of the maximum power generation capacity. If the requested power generation capacity is less than 20% of the maximum power generation capacity, the process returns to S100 and continues to monitor the SOC and requested power generation capacity.

The value determined at S102, which is 20% of the maximum power generation capacity, is one example, but a determined value should be set for the power generation capacity so that it is a little more than the power generation efficiency of the fuel cell system. For example, a power generation capacity that has a power generation efficiency of 70% or more of the maximum power generation efficiency could be used.

If it is determined at S102 that the requested power generation capacity is more than or equal to 20% of the maximum power generation capacity, the process proceeds to S103. At 5103, compressor 9 is operated, air is supplied to fuel cell 1 as the oxidant, and power generation is started. Once the compressor is operated at S103, the next steps, S104 and S114, are processed in parallel (can be processed in random order).

At S104, hydrogen circulation pump 8 is operated, hydrogen is supplied to fuel cell 1, purge valve 7 is opened and the purge process is started in order to ensure the circulation performance of hydrogen circulation pump 8, and exhaust hydrogen-processing device 24 is operated at S108. Then at S110, once air and hydrogen have permeated inside of fuel cell 1, power manager 21 starts to take electricity.

When the fuel cell starts power generation, the temperature of the fuel cell rises due to the generation of heat caused by the chemical reaction, so at S114, it is determined whether or not the fuel cell temperature meets or exceeds the target temperature. If the fuel cell temperature is more than or equal to the target temperature, the radiator fan 18 is operated at S116, the cooling-water pump 15 is operated at S118, and the process returns to S114, if it is determined at S114 that the fuel cell temperature is less than the target temperature, the radiator fan 18 is stopped at S120, the water-cooling pump 15 is stopped at S122, and the process returns to S114.

CONCLUSION

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed:

1. A fuel cell system having a fuel cell with a fuel electrode and an oxidant electrode having an electrolyte membrane therebetween, comprising:
    an oxidant supply means to supply an oxidant to the oxidant electrode and to stop the oxidant supply to the oxidant electrode when a requested amount of power generation for the fuel cell is less than a prescribed amount of power generation;
    a water condensation volume determining means for determining an amount of water condensation that accumulates in a fuel flow channel when the supply of the oxidant is stopped;
    an exhaust fuel circulation means that resupplies the fuel emitted from the fuel electrode back to the fuel electrode; and
    a controller configured to, when the requested amount of power generation is less than the prescribed amount, control the exhaust fuel circulation means based on the amount of water condensation determined by the water condensation volume determining means such that the controller operates the exhaust fuel circulation means if the amount of water condensation determined by the water condensation volume determining means exceeds a predetermined value and the controller stops the exhaust fuel circulation means if the amount of water condensation does not exceed the predetermined value.

2. The fuel cell system described in claim 1, wherein the water condensation volume determining means is a water condensation volume collector and measurer for measuring the amount of water condensation.

3. The fuel cell system described in claim 1, and further comprising:
    a fuel temperature detection means for detecting a fuel temperature of the fuel cell; and
    a fuel pressure detection means for detecting a fuel pressure of the fuel cell, wherein the water condensation volume determining means is configured to estimate an amount of water condensation that occurs within the fuel cell system after the oxidant supply means is stopped, based on the fuel temperature and the fuel pressure.

4. The fuel cell system described in claim 1, and further comprising:
    a fuel humidity detection means for detecting a fuel humidity of the fuel cell; and
    a fuel temperature detection means for detecting a fuel temperature of the fuel cell, wherein the water condensation volume determining means is configured to estimate an amount of water condensation that occurs within the fuel cell system after the oxidant supply means is stopped, based on the fuel temperature and the fuel humidity.

5. The fuel cell system described in claim 1, wherein the greater the amount of water condensation, the longer an operating time that the controller operates the exhaust fuel circulation means while the requested amount of power generation is less than the prescribed amount.

6. The fuel cell system described in claim 5, wherein rotations per minute of the exhaust fuel circulation means can be adjusted to change a smoothness of a ride.

7. The fuel cell system described in claim 1, and further comprising:
    a fuel cell cooling means for cooling the fuel cell during water removal, wherein the cooling means is configured to maintain a temperature of the fuel cell below a target operating temperature while the exhaust fuel circulation means is operating to prevent deterioration of the fuel cell due to excessive temperature.

8. The fuel cell system described in claim 1, and further comprising:
    a voltage sensor configured to sense a cell voltage, wherein the controller is further configured to operate the exhaust fuel circulation means based on the cell voltage to remove excessive voltage from the fuel cell and configured to stop circulation when removal of excessive voltage is not required.

9. A method of control of fuel re-circulation in a fuel cell system, the fuel cell system having a fuel cell with a fuel electrode and an oxidant electrode having an electrolyte membrane therebetween, the method comprising:
    supplying an oxidant to the oxidant electrode of the fuel cell with an oxidant supply means;
    re-circulating fuel emitted from the fuel electrode of the fuel cell back to the fuel electrode with an exhaust fuel circulation means;
    halting the supply of oxidant to the oxidant electrode using the oxidant supply means when a requested amount of power generation for the fuel cell is less than a prescribed amount of power generation; and
    determining an amount of water condensation that accumulates in a fuel flow channel when the supply of the oxidant is halted using a water condensation volume determining means;
    wherein, when the requested amount of power generation is less than the prescribed amount, a controller controls operation of the exhaust fuel circulation means based on the amount of water condensation measured by the water condensation volume determining means such that circulation occurs if the amount of water condensation exceeds a predetermined value and circulation is stopped if the amount of water condensation does not exceed the predetermined value.

10. The method of claim 9, and further comprising:
detecting a fuel temperature of the fuel cell; and
detecting a fuel pressure of the fuel cell; wherein determining the amount of water condensation comprises estimating the amount of water condensation based on the fuel temperature and the fuel pressure.

11. The method of claim 9, and further comprising
detecting a fuel humidity of the fuel cell; and
detecting a fuel temperature of the fuel cell; wherein determining an amount of water condensation comprises estimating the amount of water condensation based on the fuel humidity and the fuel temperature.

12. The method of claim 9, wherein the greater the amount of water condensation, the longer an operating time that the controller operates the exhaust fuel circulation means while the requested amount of power generation is less than the prescribed amount.

13. The method of claim 12, and further comprising:
adjusting rotations per minute of the exhaust fuel circulation means to change a smoothness of a ride.

14. The method of claim 9, and further comprising:
cooling the fuel cell during water removal by maintaining a temperature of the fuel cell below a target operating temperature while the exhaust fuel circulation means is operating to prevent deterioration of the fuel cell due to excessive temperature.

15. The method of claim 9, and further comprising:
sensing a fuel cell voltage; and
operating the exhaust fuel circulation means with the controller based on the fuel cell voltage to operate the exhaust fuel circulation means to remove excessive voltage from the fuel cell or to stop the exhaust fuel circulation means when removal of excessive voltage is not required.

16. A fuel cell system having a fuel cell with a fuel electrode and an oxidant electrode having an electrolyte membrane therebetween, comprising:
an oxidant source to supply an oxidant to the oxidant electrode and to stop the oxidant supply to the oxidant electrode when a requested amount of power generation for the fuel cell is less than a prescribed amount of power generation;
an exhaust fuel circulator that resupplies the fuel emitted from the fuel electrode back to the fuel electrode; and
a controller configured to, when the requested amount of power generation is less than the prescribed amount, control operation of the exhaust fuel circulator based on an amount of water condensation that accumulates in a fuel flow channel when supply of the oxidant is stopped such that circulation occurs if the amount of water condensation exceeds a predetermined value and circulation is stopped if the amount of water condensation does not exceed the predetermined value.

17. The fuel cell system described in claim 16, and further comprising:
a water condensation volume measurement element for measuring the amount of water condensation.

18. The fuel cell system described in claim 16, and further comprising:
a fuel temperature detector for detecting a fuel temperature of the fuel cell; and
a fuel pressure detector for detecting a fuel pressure of the fuel cell; wherein the controller further comprises:
a water condensation volume estimator for estimating the amount of water condensation based on the fuel temperature and the fuel pressure.

19. The fuel cell system described in claim 16, and further comprising:
a fuel humidity detector for detecting a fuel humidity of the fuel cell; and
a fuel temperature detector for detecting a fuel temperature of the fuel cell; wherein the controller further comprises:
a water condensation volume estimator for estimating the amount of water condensation based on the fuel temperature and the fuel humidity.

20. The fuel cell system described in claim 16, wherein the greater the amount of water condensation, the longer an operating time of the exhaust fuel circulator.

21. The fuel cell system described in claim 20, wherein rotations per minute of the exhaust fuel circulator can be adjusted to change a smoothness of a ride.

22. The fuel cell system described in claim 16, and further comprising:
a fuel cell cooler for cooling the fuel cell during water removal, wherein the controller is configured to control the cooler to maintain a temperature of the fuel cell below a target operating temperature while the exhaust fuel circulator is operating to prevent deterioration of the fuel cell due to excessive temperature.

23. The fuel cell system described in claim 16, and further comprising:
a voltage sensor configured to sense a fuel cell voltage, wherein the controller is configured to control the exhaust fuel circulator in accordance with the fuel cell voltage to remove excessive voltage from the fuel cell generated and to stop circulation when removal of excessive voltage is not required.

* * * * *